G. BODEN.
MACHINE FOR MAKING SAFETY PINS.
APPLICATION FILED JULY 31, 1916.

1,405,392.

Patented Feb. 7, 1922.
10 SHEETS—SHEET 1.

Witnesses:
J. H. Thurston
E. C. Alford

Inventor:
George Boden,
By Wilmarth H. Thurston,
Attorney.

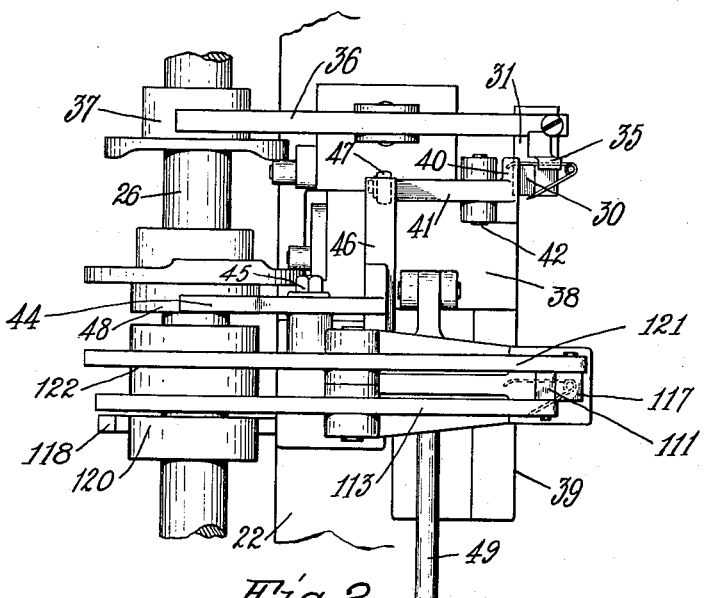
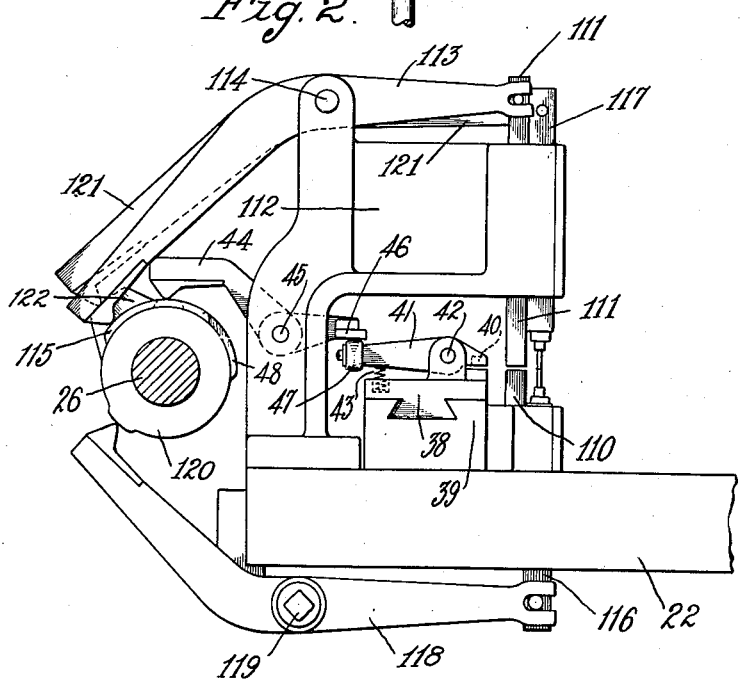

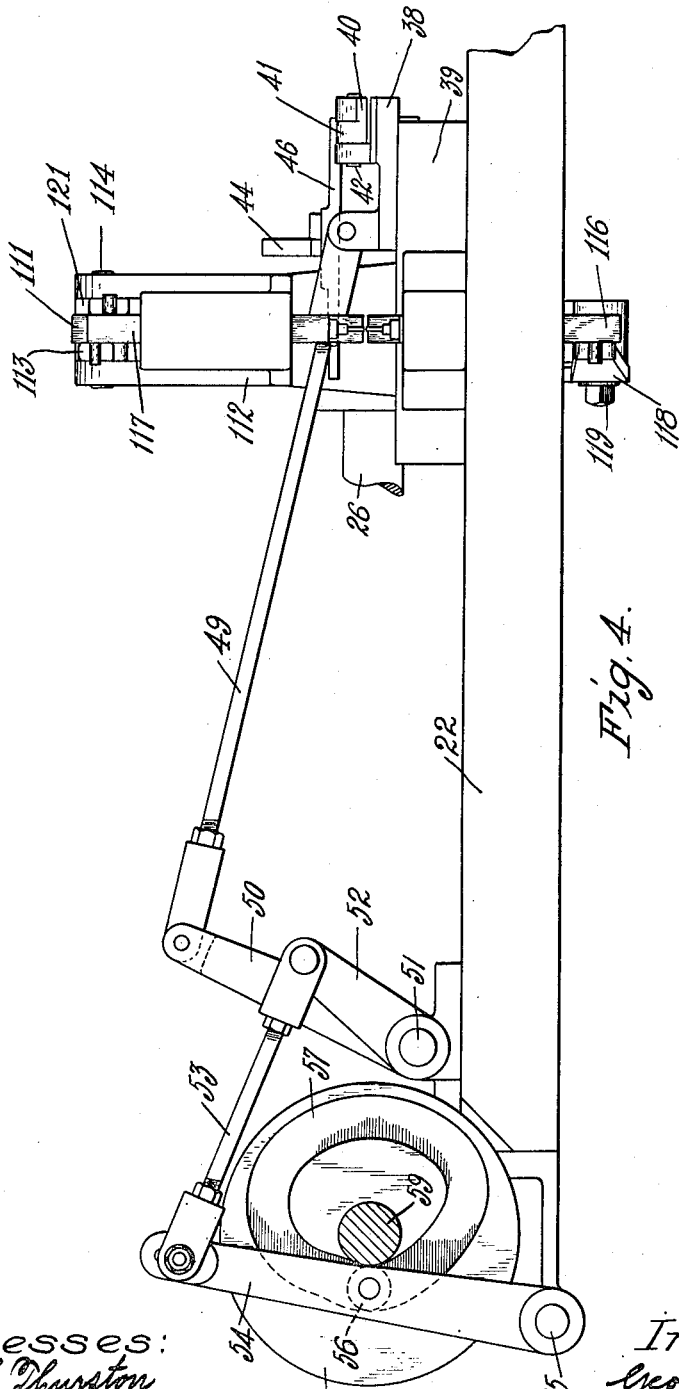

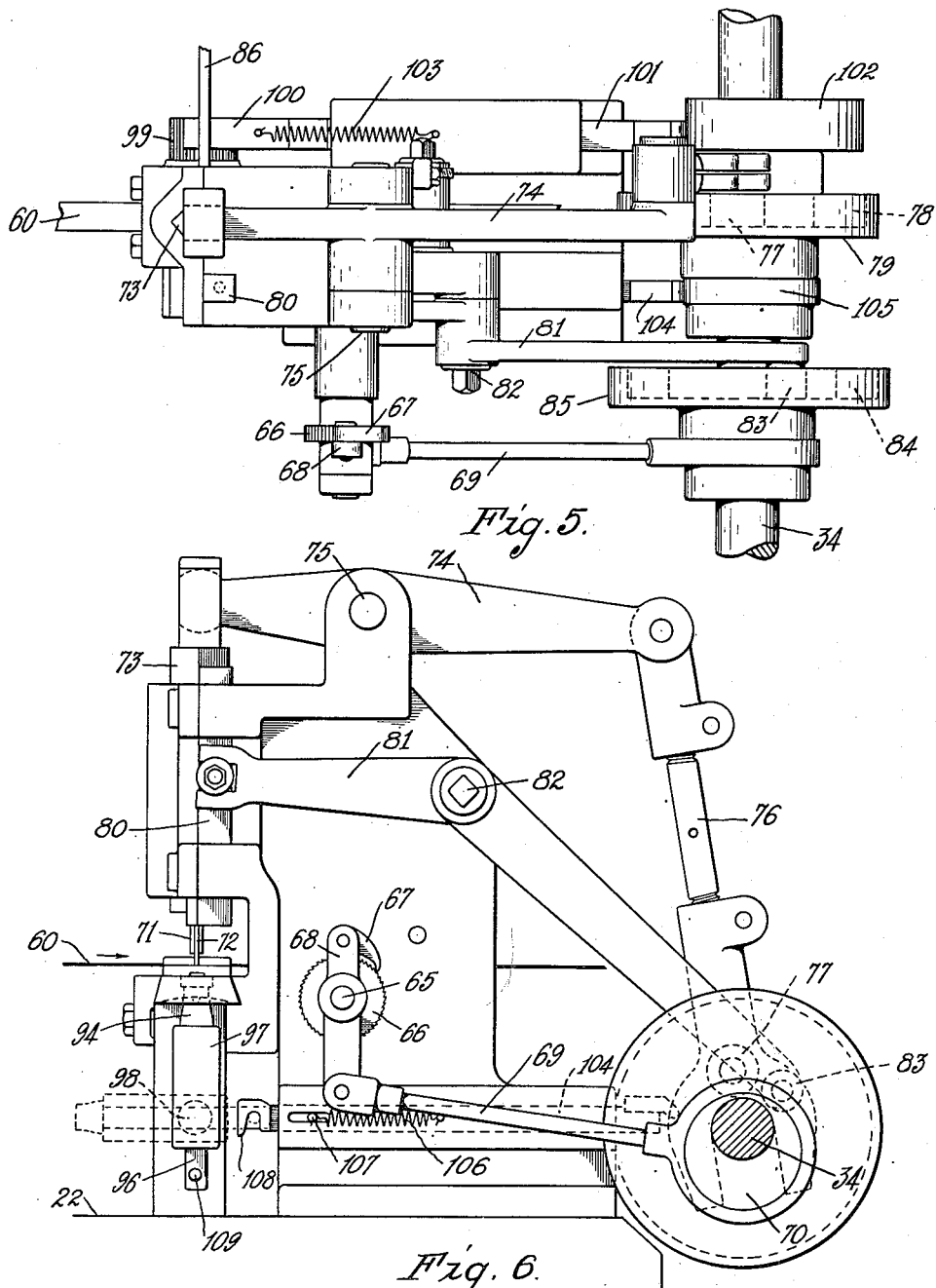

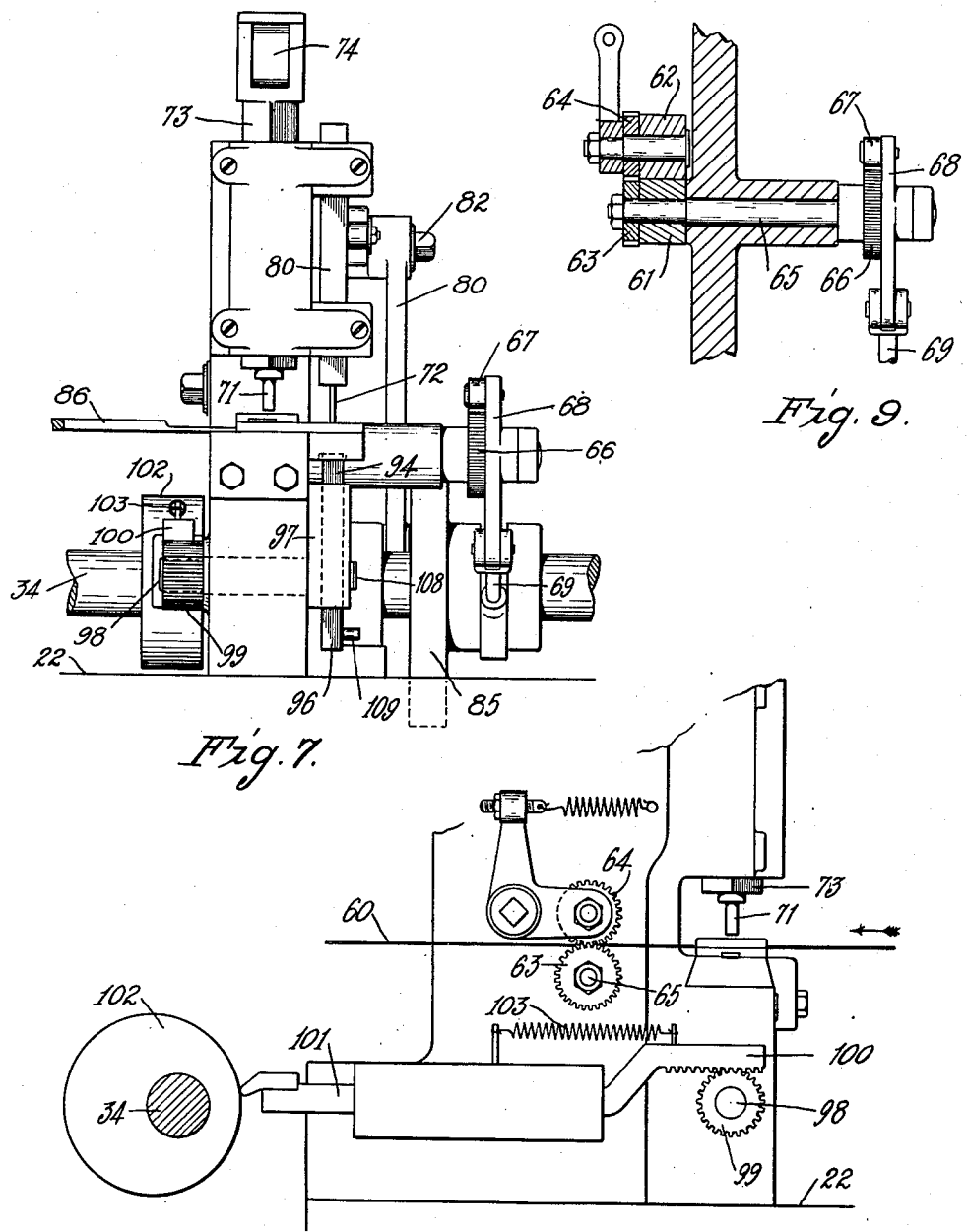

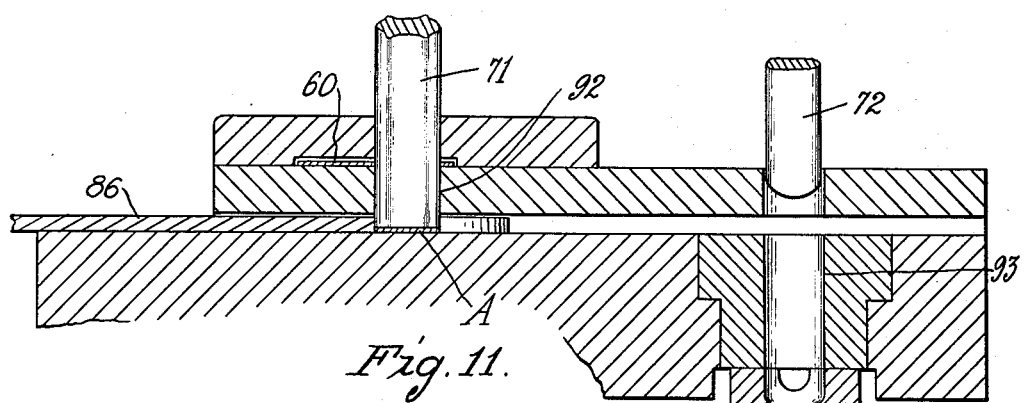
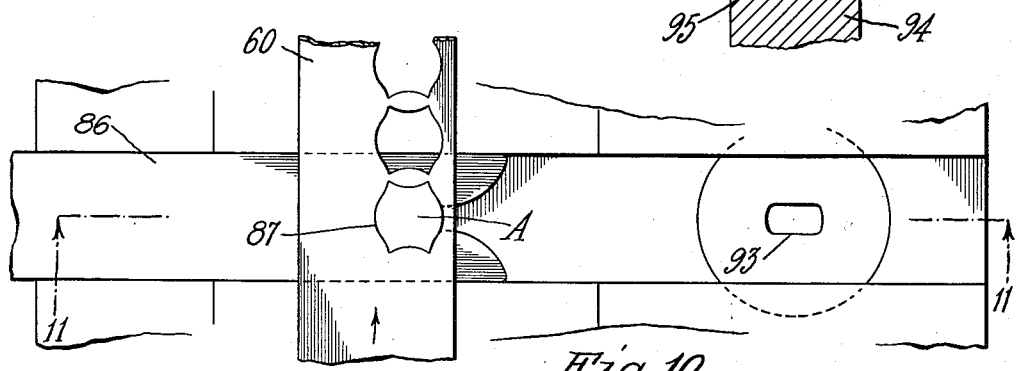
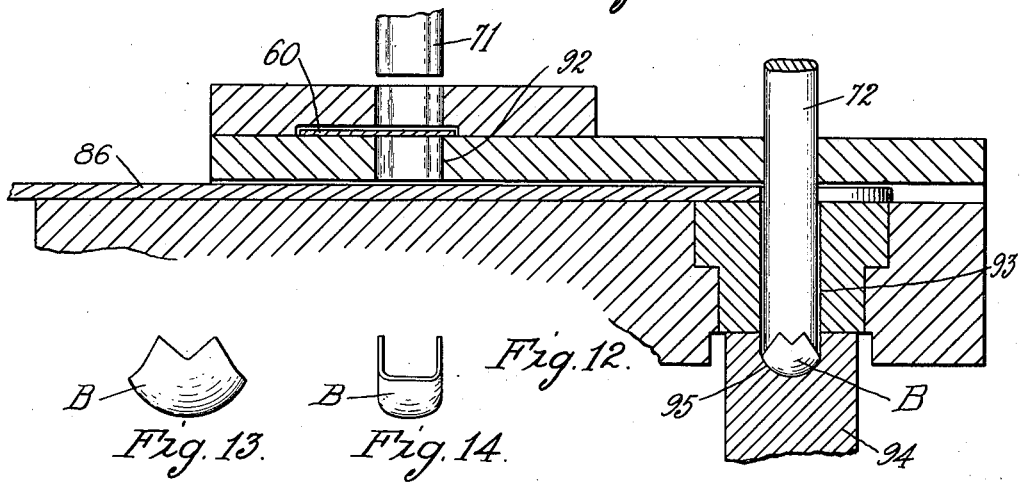
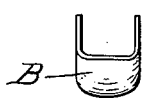

G. BODEN.
MACHINE FOR MAKING SAFETY PINS.
APPLICATION FILED JULY 31, 1916.
1,405,392.
Patented Feb. 7, 1922.
10 SHEETS—SHEET 7.
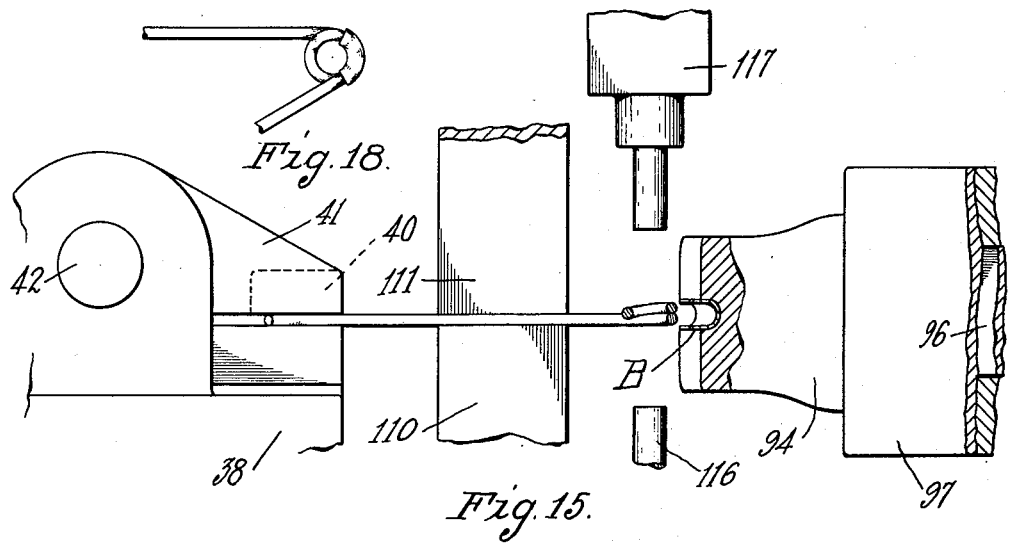
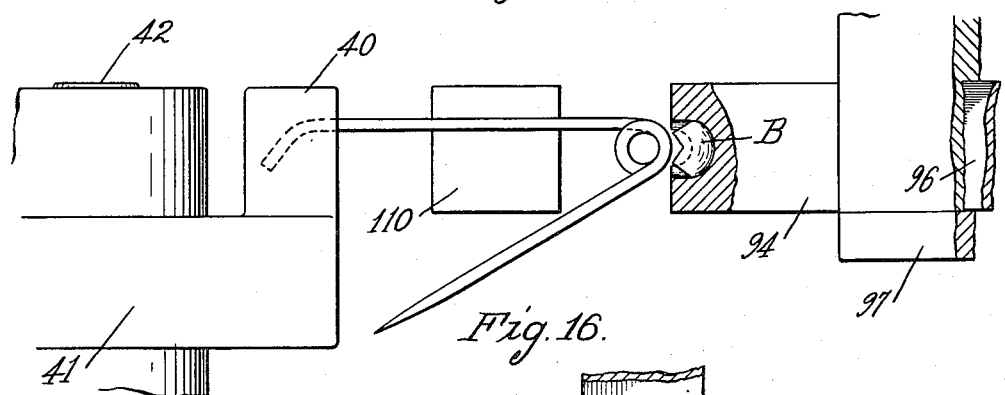
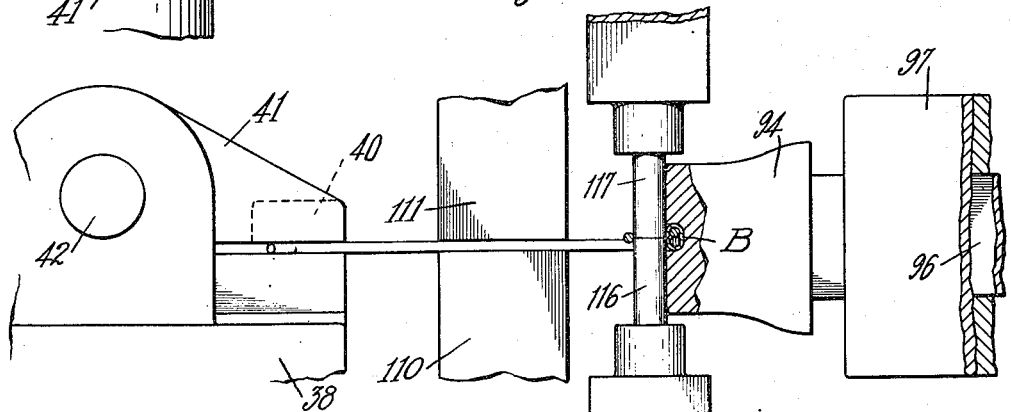
Witnesses:
J. H. Thurston
E. C. Alford
Inventor
George Boden,
By Wilmarth H. Thurston,
Attorney

UNITED STATES PATENT OFFICE.

GEORGE BODEN, OF WATERBURY, CONNECTICUT, ASSIGNOR TO OAKVILLE COMPANY, OF OAKVILLE, CONNECTICUT, A CORPORATION OF CONNECTICUT.

MACHINE FOR MAKING SAFETY PINS.

1,405,392.	Specification of Letters Patent.	Patented Feb. 7, 1922.

Application filed July 31, 1916. Serial No. 112,289.

*To all whom it may concern:*

Be it known that I, GEORGE BODEN, a citizen of the United States, of Waterbury, in the county of New Haven and State of Connecticut, have invented certain new and useful Improvements in Machines for Making Safety Pins; and I do hereby declare the following specification, taken in connection with the accompanying drawings, forming a part of the same, to be a full, clear, and exact description thereof.

The present invention relates to improvements in machines for making safety pins of the general character of the machine shown and described in the patent to Middlebrook, No. 812,762. The machine of said Middlebrook patent embodies means for bending the unpointed end of the pin-wire, means for coiling the pin, means for applying the caps, and means for closing the pin.

Safety pins are commonly provided with a guard at the coiled end of the pin for the purpose of preventing the fabric to which the pin is applied from entering between the coils or otherwise catching in the coiled end. Such guards have heretofore been made in a machine separate from the safety-pin machine and have commonly been applied to the pins by hand or by means of a foot-press, with the pin held by the person operating such foot-press, and have been applied after the pins have been otherwise completed and after they have been delivered from the safety-pin machine.

The object of the present invention is to provide a safety-pin machine with means for automatically applying such guards to the pins in and as a part of the operation of said safety-pin machine, whereby the pins will be delivered from the machine in a completely finished condition so far as the making of the pins is concerned.

To that end the invention consists in a guard-applying mechanism adapted to be embodied in a safety-pin machine and adapted to be operated in conjunction with the other mechanisms of said machine.

The invention further consists in the combination, with one or more of the mechanisms of a safety-pin machine, of a guard-applying mechanism, such guard-applying mechanism being arranged to be operated in conjunction with such other mechanism or mechanisms and in proper co-operative relation thereto.

If desired, the guards may be made in a separate machine and fed to the safety-pin machine either automatically or by hand. I prefer, however, to make the guards in the safety-pin machine, and the invention therefore further consists in the combination, with the guard-applying mechanism, of mechanism for making the guards in co-operative relation with such guard-applying mechanism.

The invention further consists in certain combinations and arrangements of parts hereinafter described and set forth in the claims.

In the accompanying drawings,

Fig. 2 is a plan view on an enlarged scale showing certain of the operating mechanisms, including the mechanism for applying the guard.

Fig. 3 is a side elevation of the mechanisms shown in Fig. 2, and is also a section on an enlarged scale on the line 3—3 of Fig. 1.

Fig. 4 is a rear elevation of the mechanisms shown in Fig. 2 and is also a section on an enlarged scale on line 4—4 of Fig. 1 with certain of the parts omitted.

Fig. 5 is a plan on an enlarged scale of the mechanism for making the guard.

Fig. 6 is a side elevation of the mechanism shown in Fig. 5, and is also a section on an enlarged scale on the line 6—6 of Fig. 1.

Fig. 7 is a front elevation of Fig. 5.

Fig. 8 is a side elevation of Fig. 5 taken from the opposite side from Fig. 6.

Fig. 9 is a detail.

Fig. 10 is a plan view on an enlarged scale showing the arrangement of the devices for cutting out and forming the guard-blanks.

Fig. 11 is a section on the line 11—11 of Fig. 10.

Fig. 12 is likewise a section on the line 11—11 of Fig. 10, but showing some of the parts in a different position.

Figs. 13 and 14 are front and end views of the formed guard.

Figs. 15, 16 and 17 are detail views of the devices for applying the guard to the coiled pin, each of said views showing the parts in different positions.

Fig. 18 shows the coiled end of a pin with the guard applied.

Figure 1:
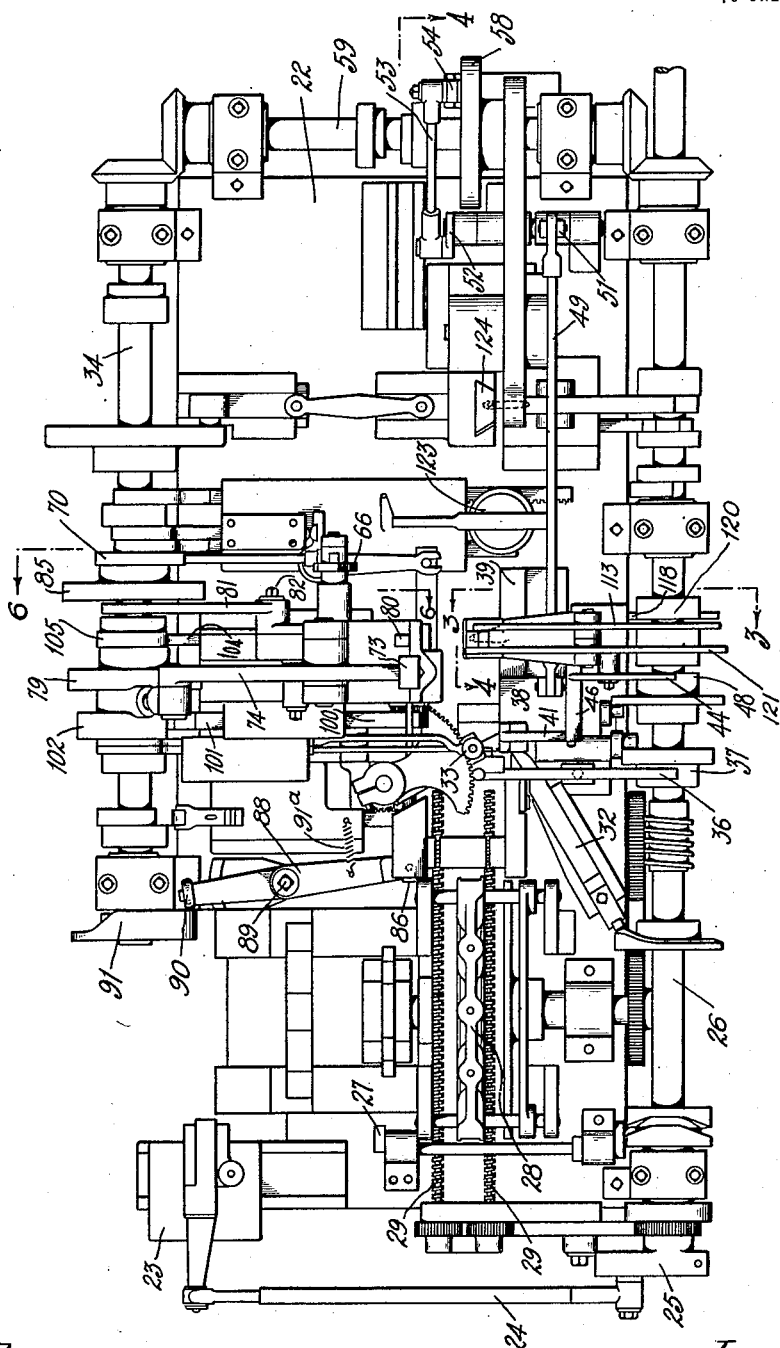
Fig. 1 is a plan view of a machine embodying the invention.

I prefer to locate the guard-applying mechanism between the coiling mechanism and the capping mechanism of the safety-pin machine, as shown in Figs. 1 to 18 inclusive. If desired, however, the guard-applying mechanism may be located beyond the capping mechanism and the closing mechanism, and so that in such case the guard will be applied to the capped and closed pin, and such modified arrangement is shown in Figs. 19 to 22 inclusive. One advantage in locating the guard-applying mechanism in advance of the capping mechanism, or more particularly in advance of the closing mechanism, is that in such case the two legs of the pin stand wide apart when the guard is applied and so that the finished pin will always open wide, whereas if the guard is applied to the closed pin there is a liability, unless care be taken to prevent it, that the pointed leg of the pin will become more or less set by the application of the guard, and so that in such case the pin would not open as wide as is desirable.

In the Middlebrook patent referred to the machine is not shown as provided with means for feeding from a coil the wire from which the pins are made, or with a cutter for severing therefrom blanks of proper length to form a pin, or with pointing mechanism, but instead it is contemplated that the pin-blanks have been previously formed and pointed and are to be fed into the machine by suitable feed-mechanism, as for example by means of screw-conveyors. In the accompanying drawings the machine is shown as provided with means for feeding the wire from a coil, with a cutter for severing the pin-blanks therefrom, and with pointing mechanism. As such means and mechanisms, however, are old and have heretofore been customarily employed, it will not be necessary to describe the same in detail.

The mechanism for bending the end of the unpointed leg of the pin-blank for the reception of the cap, the mechanism for coiling the pin, the mechanism for applying the cap, and the mechanism for closing the pin are or may be the same as shown in said Middlebrook patent, and as said mechanisms per se form no part of the present invention, they need not be described in detail.

Referring to the drawings, 22 represents the frame of the machine, upon which the several parts, including the cam-shafts which carry the operating cams, are mounted. 23 is the feed-device for feeding the wire from a coil, said feeding device being operated by a connecting rod 24 from a crank-disc 25 secured to the cam-shaft 26. A cutter 27 is operated by suitable mechanism at the proper times to sever from the wire as it is fed pin-blanks of the desired length. The pin-blanks as thus formed are delivered to wheel-carriers which carry them past the pointing mechanism 28 for pointing the ends of the blanks. After passing the pointing mechanism the pin-blanks are delivered to screw-conveyors 29, by which they are carried to the bending devices for bending the unpointed ends of the blanks.

These bending devices are similar to those shown and described in said Middlebrook patent and comprise a vertically movable anvil 30, a swinging clamping member 31, and a bender 32. These three members are operated by cams on the cam-shaft 26 through suitable connections. While the unpointed end of the wire is being bent the wire is also acted upon by the coiling mechanism 33 to form the two legs of the pin with the usual coil between them. The coiling mechanism is operated by cams on the cam-shaft 34 at the rear of the machine.

In the machine of the Middlebrook patent the coiled pin-blank is taken from the coiling mechanism by a rotary carrier which takes hold of the pointed leg of the pin while the unpointed bent leg is held by the bending devices above referred to, and in that machine the vertically movable anvil remains in its raised position and so that the pin-blank will be held by said anvil and the co-operating clamping member until the rotary carrier has taken hold of the pointed leg. The anvil is then lowered to permit the unpointed leg of the pin to pass by said anvil as the rotary carrier is operated to transfer the coiled blank from the coiling mechanism to the capping mechanism.

In the present machine a sliding carrier is provided for taking the coiled pin-blank from the coiling mechanism, and this sliding carrier is arranged to take hold of the unpointed leg, instead of the pointed leg. By reason of this it becomes desirable to lower the vertically movable anvil at an earlier time, in order to permit the passage of the sliding carrier to engage the unpointed leg. As the anvil is thus to be lowered before the sliding carrier engages said unpointed leg, the coiled blank will not be held clamped by said anvil and the co-operating clamping member for the engagement of the sliding carrier therewith, and consequently it becomes necessary to provide another clamping device to hold the coiled blank at this time.

In the construction shown, this clamping device comprises a clamping member 35 carried by a pivoted lever 36 and arranged and adapted to clamp the unpointed leg against the bed or winding table at the rear of the vertically movable anvil. Said lever and clamping member are operated by a cam 37 on the cam-shaft 26 through suitable connections.

The sliding carrier 38 is mounted to slide in ways 39 supported on the bed. In order to make room for these ways the rock-shaft for operating the vertically movable anvil is located below the bed. Said sliding carrier 38 has mounted thereon a clamping jaw 40 carried by a lever 41 pivoted at 42.

Said clamping jaw 40 is normally held in closed position by the action of a spring 43 arranged to act upon the forward end of said lever. For opening said clamping jaw at the proper times a lever 44 pivoted at 45 is provided. To the rear end of said lever is secured an elongated bar 46 arranged to overlie a roll 47 carried by the forward end of the lever 41. Said bar 46 is elongated to provide for the travel of the sliding carrier 38. The forward end of the lever 44 is arranged to be acted upon by a cam 48 on the cam-shaft 26.

When the unpointed leg of the pin-wire has been bent by the bending devices referred to, and when the pin-wire has been coiled, the coiled wire is next to be transferred by the sliding carrier above described to the mechanism for applying the guard to the coil. The clamping jaw of the sliding carrier is arranged to clamp the unpointed leg of the coiled wire. As above stated, the vertically movable anvil 30 is lowered to permit the clamping jaw 40 to pass up to and engage the unpointed leg of the wire. The mechanism for operating the sliding carrier to cause the clamping jaw 40 to engage the unpointed leg and to move the sliding carrier in the opposite direction to transfer the coiled wire from the coiling mechanism to the guard-applying mechanism is as follows:

Pivotally connected to the sliding carrier (see Fig. 4) is a connecting rod 49, the other end of which rod is pivotally connected to an arm 50 carried by a rock-shaft 51. Secured to the other end of the rock-shaft 51 is an arm 52 to which is pivotally connected one end of a connecting rod 53, the other end of said rod being pivotally connected to the upper end of an arm 54 pivoted at 55. Said arm 54 carries a roll 56 which runs in a cam-slot 57 formed on a cam-disk 58 secured to the shaft 59 at the right-hand end of the machine.

By the mechanism above described the sliding carrier 38 is moved to the left in Fig. 1 to bring the clamping jaw 40 into line with the unpointed leg of the coiled wire, said clamping jaw 40 being opened at the proper time by the action of the cam 48, and then released and closed upon the unpointed leg by the action of the spring 43. The sliding carrier is then moved to the right in Fig. 1 to transfer the coiled wire from the coiling mechanism to the guard-applying mechanism.

It is preferred to make the guards one by one in the machine, as well as to apply the guards to the coiled wires, and in the machine shown in the drawings means are provided for cutting out the guards from a strip of sheet-metal and forming them into proper shape to be applied to the coil of the wire.

Referring to Figs. 5 to 12, inclusive, the mechanism for thus cutting out and forming the guards is as follows:

Referring to Fig. 6, 60 represents a strip of sheet-metal which is fed transversely into the machine by means of a feed-device comprising a pair of rolls 61, 62, connected together by gears 63, 64. Secured to the shaft 65 which carries the lower roll 61 is a ratchet-wheel 66, which is actuated by a pawl 67 carried at the upper end of a pivoted lever 68, the lower end of which lever is connected by a rod 69 to an eccentric 70 on the cam-shaft 34. As shown in Figs. 6 and 8, the feed-rolls for the strip of metal from which the guard-blanks are cut out are located at the rear of the cutting out and forming punches, and so that said strip is pulled through the machine transversely from front to rear.

Referring particularly to Figs. 5, 6 and 7, two punches 71 and 72 are mounted to reciprocate vertically in a suitable supporting frame or head, the punch 71 serving to cut out from the strip of metal successively blanks for the guards, and the punch 72 serving to draw up said blanks into proper form to be applied to the coils of the pin-wires.

The upper end of the plunger 73, which carries the punch 71, is connected to one arm of a lever 74 pivoted at 75, the other arm of said lever being pivotally connected to a rod 76. Said rod 76 carries at its lower end a roll 77 arranged to travel in a cam-slot 78 formed in a cam-disk 79 secured to the cam-shaft 34. The plunger 80 which carries punch 72 is connected to one arm of a lever 81 pivoted at 82. The other arm of said lever carries a roll 83 which travels in a cam-slot 84 formed in a cam-disk 85 secured to said shaft 34.

The mechanism for transferring the cut-out guard-blank A from the cutting-out punch to the drawing-up punch 72 comprises a sliding carrier 86 provided with a recess 87 adapted to receive the cut-out blank, as shown in Fig. 10. Any suitable mechanism may be employed for imparting the desired sliding movement to the sliding carrier 86. As shown in the drawings (see Fig. 1) the left-hand end of said sliding carrier is pivotally connected to one arm of a lever 88 pivoted at 89. The rear end of said lever is provided with a roll 90 arranged to be acted upon by a cam 91 on the cam-shaft 34. A spring 91ª is connected to said lever 88 to operate the same in one direction.

In the construction shown the sliding carrier 86 is moved in the direction to transfer the cut-out blank from the cutting-out punch 71 to the drawing-up punch 72 by the action of the spring 91ª and is moved back to its original position to receive a new blank in the recess 87 by the action of the cam 91.

In order to save time and thus increase the speed of the operations the sliding carrier 86 is so constructed that it may begin its return movement from the drawing-up punch to the cutting-out punch before the drawing-up punch has completed its downward movement. For this purpose the right-hand end of the sliding carrier 86 is forked, so that this forked end will straddle the drawing-up punch 72, as shown in Fig. 12, the construction thus being such that said sliding carrier may begin its return movement while the drawing-up punch is moving downward and is thus projected through the recess 87 in said carrier. With this construction the sliding carrier 86 may return to its original position to bring the recess 87 in line with the cutting-out punch 71, and so that said cutting-out punch may operate to cut out a new blank, before the drawing-up punch has completed its cycle of movements.

The operation of the devices above described is as follows:—The cutting-out punch 71 descends and cuts out a guard-blank from the strip of metal and deposits such cut-out blank in the recess 87 in the sliding carrier 86. Said sliding carrier is then operated to transfer said blank from the cutting-out punch to the drawing-up punch, and when the blank has thereby been brought into line with the drawing-up punch said punch descends and draws up the blank. As above stated, the sliding carrier may be and preferably is arranged to begin its return movement before the drawing-up punch has completed its downward movement. The cutting-out punch 71 co-operates with a female die 92, and the drawing-up punch 72 co-operates with a female die 93, as shown in Figs. 11 and 12.

The next operation is to apply the formed-up guard-blank B to the coil of the coiled wire. For this operation the guard-blank requires to be transferred from the guard-forming mechanism to the guard-applying mechanism. For this purpose the guard-blank is, by the downward movement of the drawing-up punch 72, deposited in a swinging transferrer 94, which is provided at its upper end with a recess 95 of suitable shape to receive the formed-up guard-blank, as shown in Fig. 12. Said swinging carrier 94 is provided with a shank 96 which extends through a guide-head 97 secured to a rock-shaft 98 suitably supported in the frame of the machine. Said rock-shaft is provided with a gear 99 with which meshes a rack 100 formed on a rack-bar 101, said bar being mounted to slide in a suitable guideway. The rear end of the rack-bar 101 is arranged to be engaged by a cam 102 on the shaft 34, as shown in Fig. 8. A spring 103 having one end connected to the rack-bar 101 and the other end connected to a fixed part serves to keep the rack-bar in engagement with the cam 102 and to move said rack-bar in one direction when permitted to do so by the cam. The construction is such that when a guard-blank has been deposited in the swinging carrier 94, said carrier will, by the action of the cam 102, be turned from the full line vertical position to the dotted line horizontal position shown in Fig. 6.

Means are provided for imparting to the swinging transferrer 94 a lengthwise movement when said transferrer has been moved to its horizontal position for the purpose of passing the guard-blank carried by said transferrer over and on to the coiled end of the pin. For this purpose the shank 96 is slidable in the guide-head 97. As shown in Fig. 15, the enlarged head 94 abuts against said member 97 and thus keeps said shank from falling out of said member. Referring to Fig. 6, the means for thus imparting lengthwise movement to said swinging transferrer consists of a sliding bar 104 mounted to slide in a suitable guideway. The rear end of said sliding bar is arranged to engage a cam 105 on the shaft 34. A spring 106 connected at one end to a pin 107 projecting laterally from the bar 104 through a slot in the guideway and connected at the other end to a fixed part serves to hold said sliding bar 104 in engagement with the cam 105 and to return said sliding bar to its normal position when permited to do so by said cam.

The forward end of the sliding bar 104 is provided with an offset hook 108 and the shank 96 of the swinging transferrer is provided at its lower end with a laterally projecting pin 109, the construction and arrangement being such that when said swinging transferrer is swung from its vertical to its horizontal position, said pin 109 will be moved into engagement with the hook 108 and the end of the shank 96 will be brought into line and into engagement with the forward end of said sliding bar 104, as shown in the dotted line position of the parts in Fig. 6.

The operation of the mechanism above described is as follows:—When a formed-up guard blank B has been deposited in the swinging carrier 94, the cam 102 comes into operation and through the connections above described serves to turn the swinging transferrer from the full line vertical position to the dotted line horizontal position in Fig. 6, and so as thus to bring said swinging carrier into the position shown in Figs. 15 and 16. The swinging movement of the transferrer causes the pin 109 to be engaged with the hooked end of the sliding bar 104. The cam 105 then comes into operation and by the engagement of the forward end of the sliding bar 104 with the shank 96 the transferrer is moved to the left and from the position shown in Figs. 15 and 16 to the position shown in Fig. 17, thereby causing the guard-blank to be passed over and on to the coiled end of the wire. The retracting movement of said transferrer is effected by the spring 106 through the hook-connection referred to.

As hereinbefore explained, the sliding carrier 38 is moved by the means above described to transfer the coiled wire from the coiling mechanism to the guard-applying mechanism, and it is to be understood that said sliding carrier, as shown in Figs. 15, 16 and 17, has been so moved and has carried with it the coiled wire with the bent end of the unpointed leg clamped between the pivoted clamping jaw 40 and a fixed part of the carrier, as shown in said figures. As the coiled wire is thus held only at the end of the unpointed leg, it is desirable for the operation of applying the guard to the coiled end to provide an additional clamping device for supporting the body of the pin during such guard-applying operation. This additional clamping device comprises a fixed clamping member 110 and a movable clamping member 111. (See Figs. 3 and 15). As shown in Fig. 3, the movable clamping member 111 is arranged to have a vertical sliding movement in a suitable guideway formed in a bracket or head 112. The upper end of said clamping member 111 is pivotally connected to one arm of a lever 113 pivoted at 114. The other end of said lever is arranged to engage a cam 115 on the shaft 26. The parts are so timed that when the sliding carrier 38 has carried the coiled wire from the coiling mechanism to the guard-applying mechanism, the movable clamping member 111 is caused to descend and to clamp the body-wire about midway of its length, as shown in Fig. 15, such clamping action taking place prior to the operation of the guard-applying mechanism, and so that the coiled wire will be securely held in proper position for such operation.

In order to save time and to correspondingly speed the operations it is desirable to promptly return the sliding carrier 38 to its normal position, and with the employment of the clamping devices 110 and 111 this may be readily done. Thus, with the construction shown, as soon as the body-wire has been clamped by said clamping device 110, 111 the pivoted clamping jaw 40 may be released and the sliding carrier 38 immediately returned to its normal position to engage the next pin for transferring the same in turn.

The next operation is to secure the guard-blank to the coiled end of the wire and the mechanism for performing this operation will next be described. The mechanism for thus securing the guard-blank to the coiled end of the wire comprises two vertically movable co-operating plungers or punches 116 and 117, as shown in Figs. 3 and 17. The punch 116 is arranged to slide in a suitable guideway formed in the frame of the machine, while the punch 117 is arranged to slide in a suitable guideway formed in the head 112. The lower end of the punch 116 is pivotally connected to one arm of a lever 118 pivoted at 119, while the other arm of said lever is arranged to engage a cam 120 on the camshaft 26. The upper end of the punch 117 is pivotally connected to one arm of a lever 121 pivoted at 114. The other arm of said lever is arranged to engage a cam 122 on said shaft 26.

The operation of the mechanism above described is as follows:—With the body-wire clamped by the clamping device 110, 111, the swinging carrier 94 is, by the action of the cam 105 advanced from the position shown in Figs. 15 and 16 to the position shown in Fig. 17, thereby passing the guard-blank on to the coiled end of the wire, and then by the action of the cams 120 and 122 the punches 116 and 117 are caused to act upon the projecting lips of the guard-blank and to wrap the same around the outer coils of the coiled end, as plainly shown in Fig. 17, thereby properly and firmly securing the guard to the coiled end of the wire.

The coiled wire with the guard applied thereto is now to be transferred to the capping mechanism for applying the sheet-metal cap to the unpointed leg of the wire. This part of the machine as shown in Fig. 1 of the drawings is similar to the machine shown and described in the Middlebrook patent referred to and therefore need be here described only in a general way.

A rotary carrier 123, which may be constructed and operated in the same manner as the corresponding rotary carrier shown and described in said Middlebrook patent, is caused to engage the pointed leg of the coiled wire, and by swinging through an arc of 180 degrees said rotary carrier acts to transfer the coiled wire with the guard applied thereto from the guard-applying mechanism to the capping mechanism, that is, to the mechanism for applying the sheet-metal cap. The capping mechanism as shown in the drawings is indicated generally by the reference-numeral 124. Preferably the machine is provided, in connection with said capping mechanism, with means for closing the capped pins. Such closing means, however, forms no part of the present invention and therefore is not shown in the drawings. The capped pin, however, is shown in Fig. 1 as closed, such closed pin being shown partly in dotted lines.

As will be understood, the several mechanisms above described or referred to, viz., the bending mechanism for bending the unpointed leg of the wire, the coiling mechanism, the guard-forming mechanism, the guard-applying mechanism, and the capping mechanism are properly related each to the other, the operation of each of said mechanisms being properly timed so that each operation follows the other in succession in the operation of the machine, and so that the unpointed leg of the wire is first bent, then the wire is coiled, then the guard is formed and applied to the coiled end, and finally the coiled wire with the guard applied is capped. So also the several transfer mechanisms or devices above described are likewise properly timed to co-operate with the several operating mechanisms referred to, whereby the coiled wire is at the proper time transferred from the coiling mechanism to the guard-applying mechanism, and then after the guard has been formed and applied the coiled wire with the guard applied thereto is transferred from the guard-applying mechanism to the capping mechanism.

Referring to the modified construction shown in Figs. 19 to 22 inclusive, the guard-applying mechanism in this modification is located beyond the capping mechanism and the closing mechanism, the construction being such that the guard will in this case be applied to the capped and closed pin.

Figure 19:
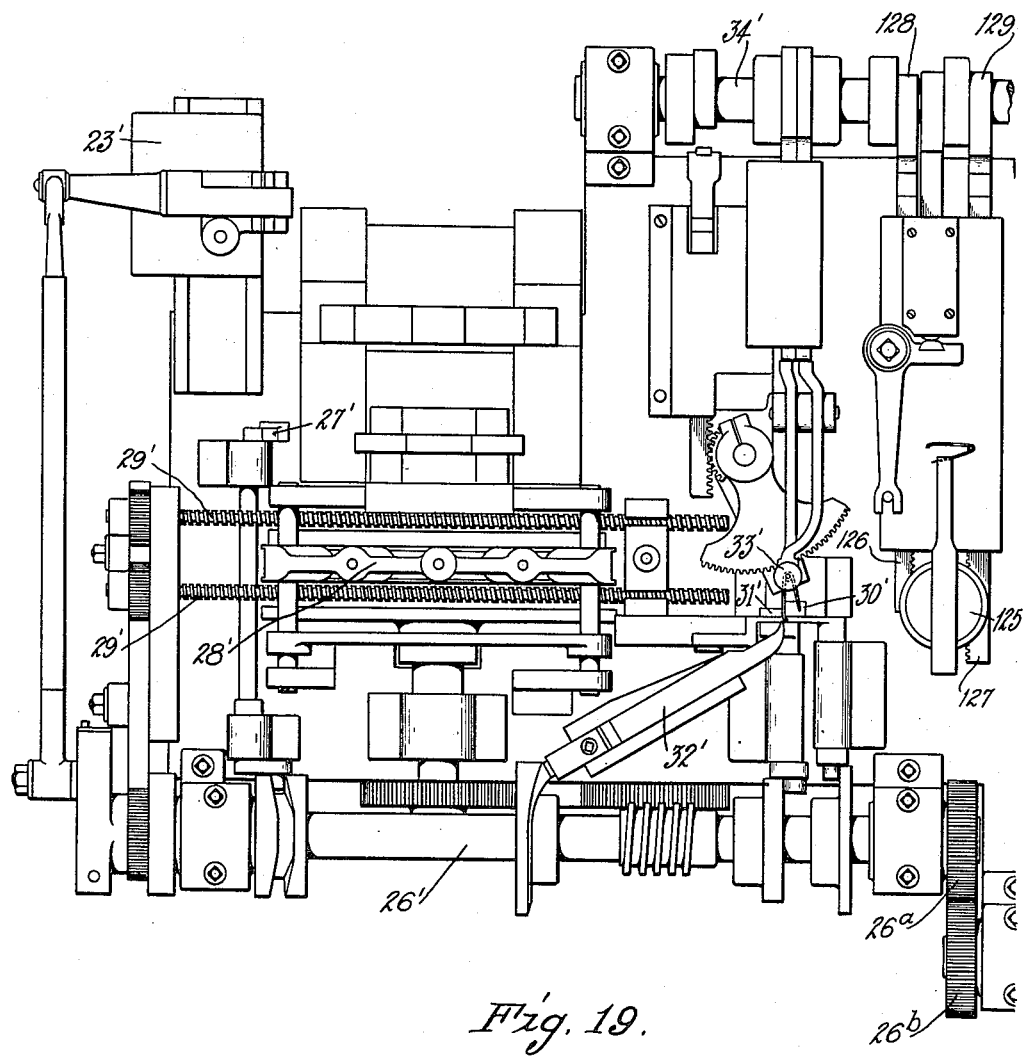
Fig. 19 is a plan view on an enlarged scale of the left-hand end of the machine, showing a modification in the arrangement of the parts.
Figure 20:
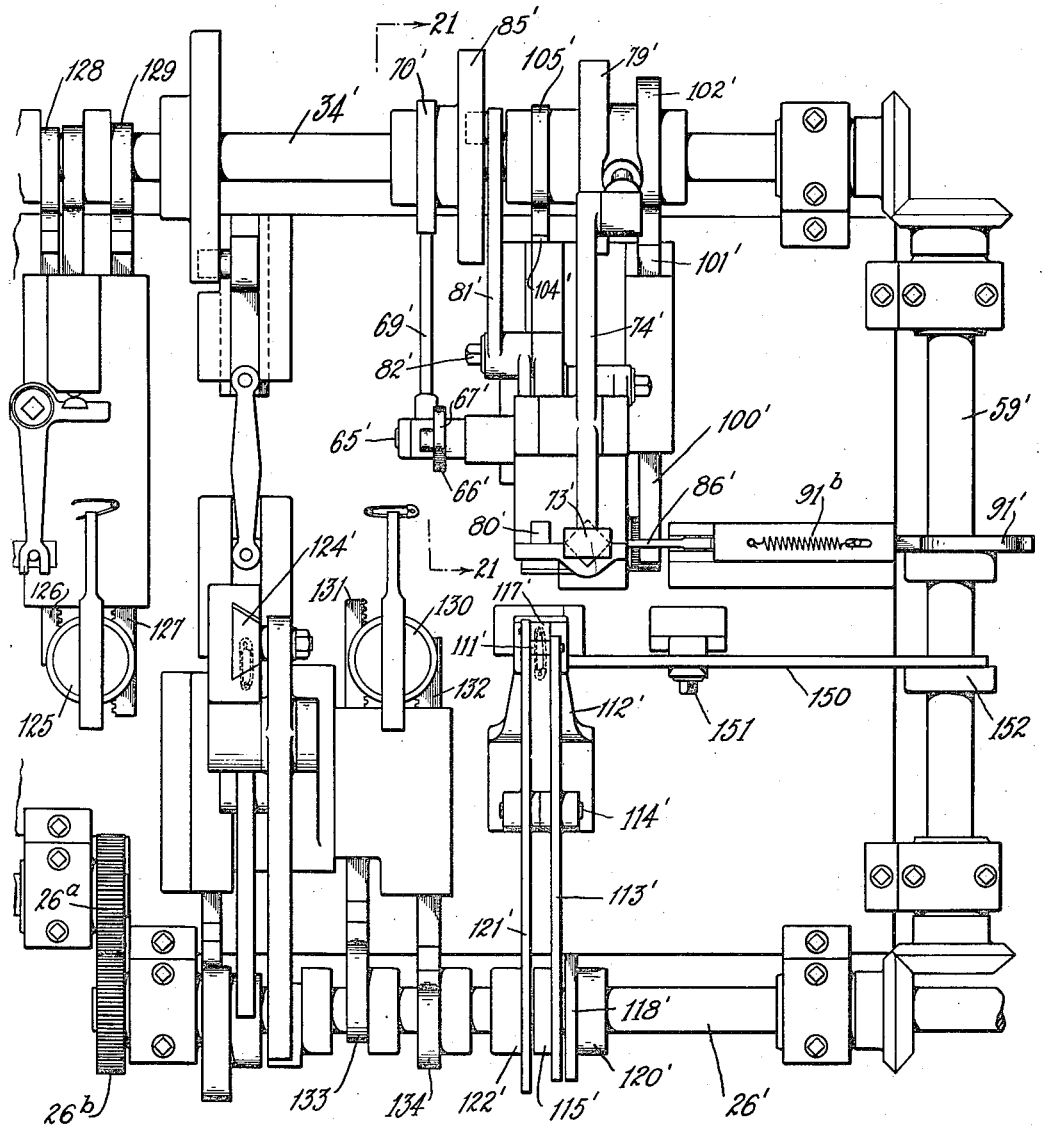
Fig. 20 is a corresponding plan view on an enlarged scale of the right hand end of the machine showing such modification.

Figs. 19 and 20 taken together constitute a plan view of this modified construction, certain parts shown at the right hand of Fig. 19 being duplicated at the left hand of Fig. 20, for the purpose of better identifying said parts and the relation thereof to the other parts of the machine.

Referring to said Figs. 19 and 20, the construction and operation of the feeding devices 23' for feeding the wire from a coil, the cutter 27', the pointing mechanism 28', the screw-conveyors 29', the bending devices, comprising a vertically movable anvil 30', a swinging clamping member 31' and a bender 32', and the coiling mechanism 33' are or may be the same as in the construction shown in Fig. 1.

In this modified construction the pin-blank, after having been coiled by the coiling mechanism and having its unpointed leg bent by the bending devices referred to, is transferred to the capping mechanism. For this purpose a rotary or oscillating carrier 125 is employed. The construction of this rotary or oscillating carrier 125 is or may be the same as the oscillating carrier 64, 65, shown and described in said Middlebrook patent, and said carrier therefore need not here be further described, it being understood that said carrier comprises clamping jaws corresponding to the jaws 64, 65, in said Middlebrook patent. So also the mechanism for operating said rotary carrier 125 is or may be the same as that shown in Fig. 17 of said Middlebrook patent, in which, as in this modification, the capping mechanism is located substantially in line with the coiling mechanism, and in which the rotary carrier is consequently rotated through an arc of 180 degrees to transfer the coiled wire from the coiling mechanism to the capping mechanism.

Briefly described, the mechanism for rotating said rotary carrier 125 comprises a pair of rack-bars 126, 127, which are actuated at the proper times through suitable connections by cams 128, 129, on the cam-shaft 34'.

The capping mechanism is indicated generally by the reference-numeral 124'. Preferably means are also provided in connection with said capping mechanism for closing the capped pins, said closing means not being shown in the drawings. The capped pin, however, is shown in dotted lines at the capping mechanism as closed.

The capped and closed pin is now to be transferred from the capping and closing mechanisms to the guard-forming and applying mechanisms. For this purpose another rotary carrier 130 of similar character and construction is employed, with means for rotating said rotary carrier through an arc of 180 degrees, such means comprising the rack-bars 131, 132, which are actuated at the proper times through suitable connections by the cams 133, 134 on the cam-shaft 26'. In this connection it may be noted that in this modification the cam-shaft 26' is, as a matter of convenience, made in two sections offset one with relation to the other and connected together by gears 26$^a$, 26$^b$.

Figure 21:
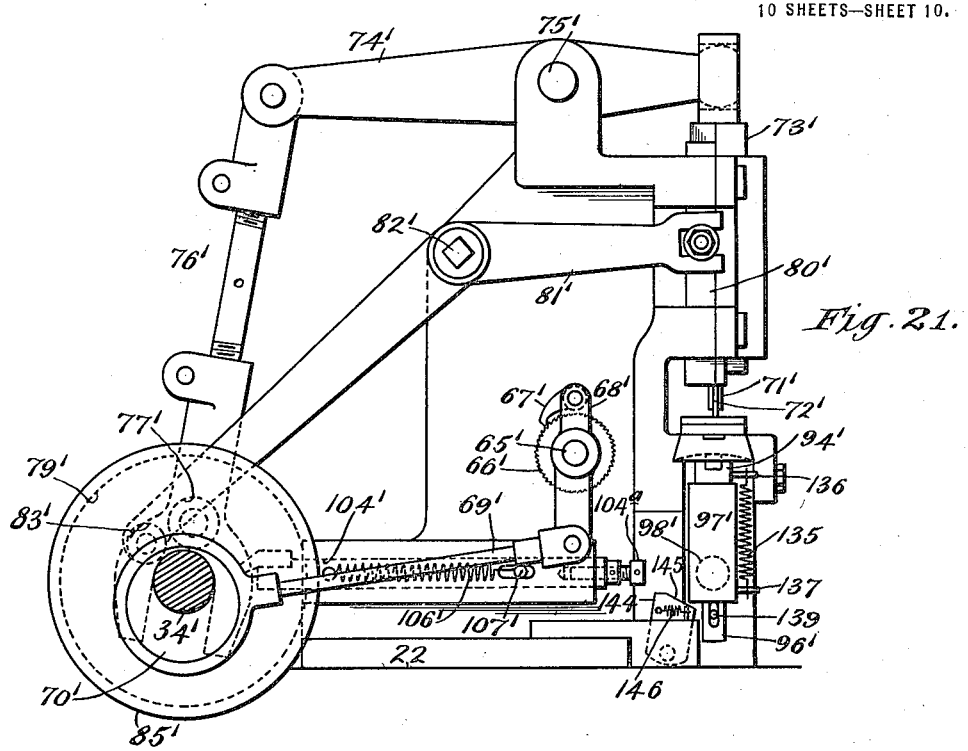
Fig. 21 is a section on an enlarged scale on line 21—21 of Fig. 20.

The guard-forming and guard-applying mechanisms are substantially the same as the corresponding mechanisms heretofore described, except that the relative position of some of the parts is reversed. Elements 117', 121' and 122' appearing in Fig. 20 substantially correspond in character and in function to the elements 117, 121, and 122 as shown and described in connection with the illustration and description of the preferred form of my invention (Figs. 1 to 18 inclusive). Referring to Figs. 20 and 21, the feed-rolls for feeding the strip of sheet-metal from which the guard-blanks are cut out are not shown, but the ratchet-wheel 66' secured to the shaft 65' which carries the lower feed-roll and the pawl 67' for actuating the same are shown. Said pawl 67' is carried at the upper end of a pivoted lever 68'. The lower end of said lever is connected by a rod 69' to an eccentric 70' on the cam-shaft 34'.

The cutting-out punch 71' and the drawing-up punch 72' are carried by plungers 73' and 80' respectively. The plunger 73' is connected to one arm of a lever 74' pivoted at 75', the other arm of said lever being pivotally connected to a rod 76'. Said rod 76' carries at its lower end a roll 77' arranged to travel in a cam-slot formed in a cam-disk 79' secured to the cam-shaft 34'. The plunger 80' is connected to one arm of a lever 81' pivoted at 82'. The other arm of said lever carries a roll 83' which travels in a cam-slot formed in a cam-disk 85, secured to said shaft 34'.

The mechanism for transferring the cut-out guard-blank from the cutting-out punch to the drawing-up punch is similar to that previously described and comprises a sliding carrier 86' provided with a recess adapted to receive the cut-out blank. In the present construction the sliding carrier is operated from the cam-shaft 59' instead of from the cam-shaft 34', and said sliding carrier is in this case operated directly by the cam 91' on said cam-shaft, instead of through an interposed lever. A spring 91ᵇ is connected to the sliding carrier to operate the same in one direction. In the construction shown, the sliding carrier 86' is moved in a direction to transfer the cut-out blank from the cutting-out punch to the drawing-up punch by the action of said spring 91ᵇ and is moved back to its original position to receive a new blank by the action of the cam 91'. Preferably the sliding carrier 86' has its forward end forked to straddle the drawing-up punch, in order to enable the sliding carrier to begin its return movement from the drawing-up punch to the cutting-out punch before the drawing-up punch has completed its downward movement, thereby saving time and thus increasing the speed of the operations. The operation of this guard-forming mechanism is the same as heretofore described with respect to the construction shown in Fig. 1.

Figure 22:
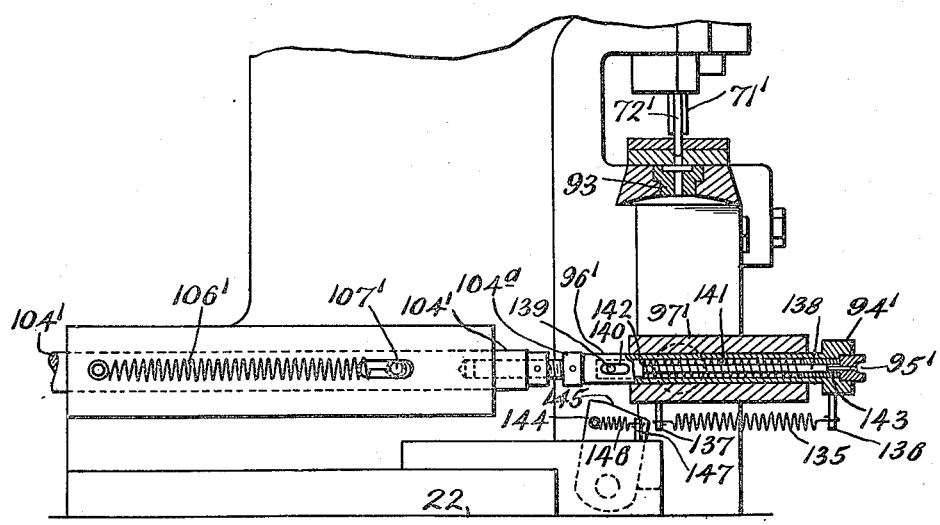
Fig. 22 is a view corresponding to Fig. 21 somewhat enlarged and with certain parts omitted and showing other parts in a different position, and with certain of the parts shown in section.

Referring now to the mechanism for applying the formed-up guard-blank to the coil of the coiled wire, and to the mechanism for transferring said guard-blank from the guard-forming mechanism to the guard-applying mechanism, the guard-blank is, by the downward movement of the drawing-up punch, deposited in a swinging transferrer 94', which is provided at its upper end with a recess 95' of suitable shape to receive the formed-up guard-blank, as shown in Figs. 21 and 22. Said swinging carrier 94' is provided with a shank 96' which extends through a guide-head 97' secured to a rock-shaft 98' suitably supported in the frame of the machine.

The mechanism for actuating said rock-shaft for swinging said swinging carrier 94' from its normal vertical position to a horizontal position is the same as that heretofore shown and described, and it has therefore not been deemed necessary to show such mechanism in connection with the modified construction now being described. It will be understood that the construction of this operating mechanism is such that, when a guard-blank has been deposited in the swinging carrier 94', said carrier will, by the action of said mechanism, be turned from its vertical position to a horizontal position, as shown in Fig. 22. Means are provided for imparting to the swinging transferrer 94' a lengthwise movement, when said transferrer has been moved to its horizontal position, for the purpose of passing the guard-blank carried by said transferrer over and on to the coiled end of the pin. The means for thus imparting lengthwise movement to the swinging transferrer to carry the guard-blank on to the coiled end of the pin is substantially the same as that heretofore described and consists of a sliding bar 104' mounted to slide in a suitable guide-way. Preferably said sliding bar 104' is provided at its forward end with an adjustable member 104ᵃ as shown in Fig. 22.

Said sliding bar is arranged to be actuated by a cam 105' on the shaft 34'. A spring 106' connected at one end to a pin 107' projecting laterally from the bar 104' through a slot in the guide-way and connected at the other end to a fixed part serves to hold said sliding bar in engagement with its actuating cam and to return said sliding bar to its normal position when permitted to do so by said cam.

The means for withdrawing the swinging transferrer from the coiled end of the pin after the guard-blank has been applied thereto is different from that heretofore described. Instead of providing the sliding bar 104' with a hook to engage a pin projecting from the shank of the swinging transferrer, a spring 135 is employed, one end of which is connected to a pin 136 projecting from the head of the swinging transferrer and the other end of which is connected to a pin 137 projecting from the guide-head 97'. With this construction as will be seen the spring 106' serves to return the sliding bar 104' to normal position, and the spring 135 serves to return the swinging carrier 94' to normal position in the guide-head 97'.

If it should happen that no coiled wire was presented in proper position for the guard-blank held in the recess 95' of the swinging carrier 94' to be applied to, the result would be to leave said guard-blank in said carrier, which would interfere with and practically prevent the proper reception of the guard-blank next formed. Preferably, therefore, a knock-out device or ejector is employed in connection with the swinging transferrer for the purpose of ejecting the guard-blank therefrom, in the event that said guard-blank should not be removed from the recess in said transferrer by the application thereof to a coiled wire. Such ejector and the means for operating the same are shown in Fig. 22.

Said ejector consists of a pin 138 slidably mounted in a longitudinal recess formed in the shank 96' of the swinging transferrer. A pin 139 projects laterally from said slidable pin 138 through a slot 140 formed in the shank 96'. Located in the longitudinal recess of the shank 96' and surrounding the slidable pin 138 is a spring 141, one end of which abuts against a shoulder 142 formed on the slidable pin 138 and the other end of which abuts against a bushing 143 inserted in the longitudinal recess in the shank 96' as shown in Fig. 22. As will be seen, the forward end of the slidable pin 138 is arranged to be projected through the bottom of the recess 95' of the swinging transferrer.

The means for actuating the ejector 138 comprises a swinging cam 144 pivoted to a fixed part of the machine, said cam being provided at its upper end with a suitably formed cam-surface 145, as shown in Fig. 22. A spring 146 is connected at one end to said swinging cam and at the other end to a fixed pin 147.

The operation of the ejector mechanism above described is as follows:—Referring to Fig. 21, it will be seen that when the swinging transferrer 94' is in its vertical position to receive the guard-blank, the laterally projecting pin 139 is to the left of the swinging cam 144. When now the swinging transferrer is moved from its vertical position to the horizontal position shown in Fig. 22, said pin 139 will come in contact with the swinging cam 144 and swing said cam to the right, thereby enabling said pin 139 to pass by and above said cam and to the position in relation thereto shown in Fig. 22. When the pin 139 has thus passed clear of the swinging cam 144 the spring 146 will act to return said swinging cam to its normal position. When now the swinging transferrer is returned from horizontal position to its normal vertical position, the laterally projecting pin 139 will come in contact with the cam-surface 145 at the upper end of the swinging cam 144, and as the swinging transferrer continues to be moved toward its vertical position the engagement of said pin 139 with said cam 144 will cause the slidable ejector-pin 138 to be projected into the recess 95' in the swinging transferrer, and so that, if there shall be at any time a guard-blank left in said recess when the swinging transferrer is returned to its normal vertical position, such guard-blank will be ejected therefrom. When the pin 139 has passed by the swinging cam 144 the spring 141 will act to return the ejector pin to its normal position.

With the construction last above described and in which a spring 135 is employed for returning the swinging transferrer to its normal longitudinal position in the guide-head, and in which the ejector-pin with the co-operating spring 141 is also employed, it is necessary that the spring 135 should be stronger than said spring 141, and for the reason that, if such were not the case, when the ejector pin is projected forward by the action of the cam-surface 145 upon the laterally projecting pin 139, the result would be to project forward the swinging transferrer itself, which is not desired. To prevent this, therefore, the spring 135 is made sufficiently strong to hold the swinging transferrer against movement when the ejector-pin is acted upon by the cam-surface referred to.

While the knock-out device or ejector for ejecting from the swinging transferrer any guard-blank which may chance to be left therein has been shown and described in connection with the modified construction shown in Figs. 19 to 22, it will be understood that such ejector may likewise be employed in connection with the swinging transferrer in the construction shown in Figs. 1 to 18 and hereinbefore described. It is to be noted, however, that in case such ejector were to be employed in connection with the swinging transferrer shown in Fig. 6, some means other than the hook-connection between the sliding transferrer and the sliding bar 104 should be provided for returning the sliding transferrer to its normal position longitudinally in the guide-head 97, and preferably a spring corresponding to the spring 135 shown in Fig. 22 would be employed for this purpose.

Referring now to the means for applying the guard to the coiled end of the capped and closed pin, such means is substantially the same as that heretofore described. In the modification now being described, the capped and closed pin is, as above stated, transferred from the capping and closing mechanisms to the guard-forming and guard-applying mechanisms by the rotary carrier 130, and as shown in Fig. 20 the clamping jaws of said rotary carrier clamp the body-wire of the pin about midway of its length, and this being the case, the capped and closed pin might be held for application of the guard thereto by said rotary carrier. In order, however, to permit said rotary carrier 130 to return to its normal position while the guard is being applied to the pin, and thus to save time, it is preferred to employ another pair of clamping members, corresponding to the clamping members 110, 111, shown in Figs. 3 and 15, to clamp and hold the pin while the guard is being applied thereto. The upper end of the upper clamping member 111' is shown in Fig. 20, but the lower co-operating member is not shown, being directly below said upper member and concealed thereby. As in this modified construction the capped end of the pin will be carried by the rotary carrier 130 past the lower clamping member, it is preferred to make said lower clamping member, as well as the upper clamping member 111' vertically movable. The desired vertical movements are imparted to said lower clamping member by a lever 150 pivoted at 151 adapted to be acted upon by a cam 152 on the cam-shaft 59'. Corresponding vertical movements are imparted to the upper clamping member 111' by means of a lever 113' arranged to be acted upon by a cam 115' on the cam-shaft 26'. The parts are so timed that, as the rotary carrier 130 is operated, the clamping members referred to are each moved vertically to separate the same and to permit the capped and closed pin to be carried between them as the rotary carrier 130 continues its transferring movement. Said clamping members are then actuated by their cams to clamp the other leg of the capped and closed pin, said clamping members then serving to hold the pin in position while the guard is being applied thereto. As soon as the pin has been clamped by said clamping members the rotary carrier 130 begins to return to its normal position.

The mechanism for securing the guard-blank to the coiled end of the pin is the same as that heretofore shown and described, and comprises two vertically movable co-operating plungers or punches corresponding to the plungers or punches 116 and 117 heretofore described. The construction of these punches and the means for operating them are the same as shown in Fig. 3, and it has therefore not been deemed necessary to show such construction over again in connection with the modified construction of machine now being described.

The operation of the modified construction will be readily understood from the foregoing description of the construction and arrangement of parts. In this modified construction, not only is the wire coiled and the unpointed leg bent, but the cap is applied and the pin preferably closed, before the guard is applied to the coiled end, and the capped and closed pin is transferred from the capping and closing mechanism to the guard-forming and applying mechanism. The several mechanisms are properly related each to the other, the operation of each of such mechanisms being properly timed so that each operation follows the other in proper succession in the operation of the machine, and the several transfer mechanisms or devices are likewise properly timed to co-operate with the several operating mechanisms, whereby the several operations for making the safety-pin, including the capping and closing of the pin, are successively performed and the capped and closed pin is then transferred from the capping and closing mechanisms to the guard-applying mechanisms.

What I claim as my invention and desire to secure by Letters Patent is:

1. In a safety pin machine, and in combination, means for supporting a coiled pin blank, and means acting independently of the blank for assembling a guard with the coil of the blank.

2. In a safety pin machine, and in combination, means for supporting a coiled pin blank, means for supporting the guard, and means for assembling the guard with the coil of the blank, the guard being supported independently of the blank during the assembling operation.

3. A safety-pin machine embodying means for forming safety pins and mechanism for applying guards directly to the outside of the coils of the safety-pins as they are successively formed in the machine.

4. A safety-pin machine having in combination mechanism for coiling a wire to form the body of a safety-pin, and mechanism for applying a guard directly to the outside of the coil.

5. A safety pin machine having in combination mechanism for coiling a wire to form the body of a safety-pin, mechanism acting independently of the pin for assembling a guard with the coil of the pin, and mechanism for applying a cap to the unpointed leg of the pin.

6. A safety pin machine having in combination mechanism for coiling a wire to form the body of a safety pin, mechanism for forming a guard for the coil of the pin, and mechanism acting independently of the pin for applying the formed guard to the coil.

7. A safety pin machine having in combination mechanism for coiling a wire to form the body of a safety pin, mechanism for forming a guard for the coil of the pin, mechanism acting independently of the pin for applying the formed guard to the coil thereof, and mechanism for applying a cap to the unpointed leg of the pin.

8. A safety-pin machine having in combination mechanism for coiling a wire to form the body of a safety-pin, mechanism for applying a guard to the coil, and means for transferring the coiled wire from said coiling mechanism to said guard-applying mechanism.

9. A safety-pin machine having in combination mechanism for coiling a wire to form the body of a safety-pin, mechanism for applying a guard to the coil, and a sliding carrier for transferring the coiled wire from said coiling mechanism to said guard-applying mechanism.

10. A safety-pin machine having in combination mechanism for coiling a wire, mechanism for applying a guard to the coil, a transferrer for transferring the coiled wire from the coiling mechanism to the guard-applying mechanism, and a clamp for holding the coiled wire to be engaged by said transferrer.

11. A safety-pin machine having in combination mechanism for coiling a wire, mechanism for applying a guard to the coil, a sliding carrier for transferring the coiled wire from the coiling mechanism to the guard-applying mechanism, and a clamp for holding the coiled wire to be engaged by said sliding carrier.

12. A safety-pin machine having in combination mechanism for coiling a wire, mechanism for applying a guard to the coil, a transferrer for transferring the coiled wire from the coiling mechanism to the guard-applying mechanism, clamping members for holding said coiled wire to be engaged by said transferrer, and means for closing and opening said clamping members to clamp and release said coiled wire.

13. A safety-pin machine having in combination mechanism for coiling a wire, mechanism for applying a guard to the coil, a sliding carrier for transferring the coiled wire from the coiling mechanism to the guard-applying mechanism, clamping members for holding said coiled wire engaged by said sliding carrier, and means for closing and opening said clamping members to clamp and release said coiled wire.

14. A safety-pin machine having in combination mechanism for coiling a wire, mechanism for applying a guard to the coil, and a sliding carrier for transferring the coiled wire from the coiling mechanism to the guard-applying mechanism, said sliding carrier being provided with a clamping member to hold the coiled wire while being transferred by said sliding carrier.

15. A safety-pin machine having in combination mechanism for coiling a wire, mechanism for applying a guard to the coil, a sliding carrier for transferring the coiled wire from the coiling mechanism to the guard-applying mechanism, said sliding carrier being provided with a clamping member, a spring acting to normally hold said clamping member closed, and a cam for opening said clamping member.

16. A safety-pin machine having in combination mechanism for coiling a wire, mechanism for applying a guard to the coil, a sliding carrier for transferring the coiled wire from the coiling mechanism to the guard-applying mechanism, said sliding carrier being provided with a clamping member, and means adapted to open and close said clamping member at each end of the movements of said sliding carrier.

17. A safety-pin machine having in combination mechanism for coiling a wire, mechanism for applying a guard to the coil, a sliding carrier for transferring the coiled wire from the coiling mechanism to the guard-applying mechanism, said sliding carrier being provided with a clamping member, a spring for normally holding said clamping member closed, an opening device extending in the direction of movement of said sliding carrier for opening said clamping member, and means for actuating said opening device.

18. A safety-pin machine having in combination mechanism for coiling a wire, mechanism for applying a guard to the coil, a sliding carrier for transferring the coiled wire from the coiling mechanism to the guard-applying mechanism, said sliding carrier being provided with a clamping member, a spring for normally holding said clamping member closed, an elongated bar extending in the direction of movement of said sliding carrier, and a cam for actuating said elongated bar.

19. Guard-forming mechanism having in combination a cutting-out punch, a drawing-up punch, and a transferrer for transferring the cut-out guard-blank from the cutting-out punch to the drawing-up punch, said transferrer being formed to permit the return movement thereof while the drawing-up punch is in the path of movement of said transferrer.

20. Guard-forming mechanism having in combination a cutting-out punch, a drawing-up punch, and a transferrer for transferring the cut-out guard-blank from the cutting-out punch to the drawing-up punch, said transferrer being formed to permit the return movement of said transferrer before the drawing-up punch has completed its cycle of movements.

21. Guard-forming mechanism having in combination a cutting-out punch, a drawing-up punch, and a sliding carrier for transferring the cut-out guard-blank from the cutting-out punch to the drawing-up punch, said sliding carrier being formed to permit the return movement of said sliding carrier to begin while the drawing-up punch is in the path of movement of said sliding carrier.

22. Guard-forming mechanism having in combination a cutting-out punch, a drawing-up punch, and a sliding carrier for transferring the cut-out guard-blank from the cutting-out punch to the drawing-up punch, said sliding carrier being forked at its end to straddle the drawing-up punch and thus to permit said sliding carrier to return before the drawing-up punch has completed its cycle of movements.

23. A safety-pin machine having in combination mechanism for coiling a wire to form a safety pin blank, mechanism for forming a guard, mechanism acting independently of the pin blank for applying the guard to the coil thereof, and means for transferring the guard from the guard forming mechanism to the guard applying mechanism.

24. A safety-pin machine having in combination mechanism for coiling a wire to form a safety pin blank, mechanism for forming a guard, mechanism acting independently of the pin blank for applying the guard to the coil of the blank, and a swinging transferrer for transferring the guard from the guard forming mechanism to the guard applying mechanism.

25. A safety pin machine having in combination mechanism for coiling a wire to form a safety pin blank, mechanism for forming a guard, mechanism acting independently of the blank for applying the guard to the coil thereof, a swinging transferrer for transferring the guard from the guard forming mechanism to the guard applying mechanism, and means for moving said transferrer longitudinally to place the guard on said coil.

26. A safety pin machine having in combination mechanism for coiling a wire to form a safety pin blank, mechanism for forming a guard, mechanism acting independently of the blank for applying the guard to the coil thereof, a swing transferrer for transferring the guard from the guard forming mechanism to the guard applying mechanism, a sliding bar arranged to engage said transferrer longitudinally to carry the guard on to the coil of the blank, and a cam for actuating the bar.

27. A safety pin machine having in combination mechanism for coiling a wire to form a safety pin blank, mechanism for forming a guard, mechanism acting independently of the blank for applying the guard to the coil thereof, a swinging transferrer to transfer the guard from the guard forming mechanism to the guard applying mechanism, a sliding bar arranged to engage said transferrer longitudinally to carry the guard on to the coil, a cam for actuating said sliding bar, and a spring for returning said swinging transferrer to its normal position lengthwise.

28. A safety pin machine having in combination a guard forming mechanism, mechanism for applying the guard directly to the coil of a safety pin blank, and means acting independently of the pin blank for transferring the formed guard from the guard forming mechanism to the guard applying mechanism.

29. A safety pin machine having in combination guard forming mechanism, mechanism acting independently of the pin blank for applying the guard directly to the coil of the blank, a transferrer for the formed guard, and means for operating the transferrer to transfer the guard from the forming mechanism to the applying mechanism.

30. Guard-transferring mechanism comprising a transferrer adapted to have both a swinging movement and a longitudinal movement, means for swinging said transferrer, means for moving said transferrer longitudinally, and means whereby the swinging of said transferrer will serve to effect an operative connection between said transferrer and the means for moving the same longitudinally.

31. Guard-transferring mechanism comprising a transferrer adapted to have both a swinging movement and a longitudinal movement, means for swinging said transferrer, and a sliding bar for moving said transferrer longitudinally, the swinging of said transferrer serving to bring said transferrer into the path of movement of said sliding bar.

32. Guard-transferring mechanism comprising a swinging transferrer adapted to have both a swinging movement and a longitudinal movement, means for swinging said transferrer, a sliding bar for moving said transferrer longitudinally, said sliding bar being provided with a hook-end, said hook-end being arranged to be engaged by a projection on the sliding transferrer when said sliding transferrer is swung from one position to another.

33. A safety-pin machine having in combination mechanism for coiling a wire, mechanism for forming a guard, mechanism for applying a guard, means for transferring the coiled wire to the guard-applying mechanism, and means for transferring a guard to said guard-applying mechanism.

34. A safety-pin machine having in combination mechanism for coiling a wire, mechanism for forming a guard, mechanism for applying a guard, means for transferring the coiled wire to the guard-applying mechanism, means for transferring a guard to said guard-applying mechanism, and a clamp for holding the coiled wire for the application of the guard thereto.

35. A safety-pin machine having in combination mechanism for coiling a wire, mechanism for applying a guard, a transferrer for transferring the coiled wire from the coiling mechanism to the guard-applying mechanism, and a clamp to receive the coiled wire from said transferrer and hold the same for the application of a guard thereto.

36. A safety-pin machine having in combination mechanism for coiling a wire, mechanism for applying a guard, a transferrer for transferring the coiled wire from the coiling mechanism to the guard-applying mechanism, a clamp to receive the coiled wire from said transferrer, and means for actuating said transferrer, said means operating to return said transferrer after the coiled wire has been engaged by said clamp, and before the guard-applying mechanism has completed its operation.

37. A safety-pin machine having in combination mechanism for coiling a wire, mechanism for applying a guard, a sliding carrier for transferring the coiled wire from the coiling mechanism to the guard-applying mechanism, and a clamp to receive the coiled wire from said sliding carrier and hold the same for the application of a guard thereto.

38. A safety-pin machine having in combination mechanism for coiling a wire, mechanism for applying a guard, a sliding carrier to transfer the coiled wire from the coiling mechanism to the guard-applying mechanism, a clamp to receive the coiled wire from said carrier, and means for actuating said carrier, said means operating to return said carrier after the coiled wire has been engaged by said clamp and before the guard-applying mechanism has completed its operation.

39. A safety-pin machine having in combination mechanism for coiling a wire, mechanism for applying a guard, a sliding carrier to transfer the coiled wire from the coiling mechanism to the guard-applying mechanism, said sliding carrier being provided with a clamping device, a clamp to receive the coiled wire from said carrier, and means for actuating said carrier, said means operating to return said carrier after the coiled wire has been engaged by said clamp and before the guard-applying mechanism has completed its operation.

40. A safety-pin machine having in combination mechanism for coiling a wire to form a safety pin blank, mechanism acting independently of the blank for applying a guard to the coil, said guard-applying mechanism comprising two oppositely acting plungers, and a clamp for holding said coiled wire for the operation of said plungers.

41. Guard-transferring mechanism comprising a transferrer adapted to have a swinging movement imparted thereto, said transferrer being provided with an ejector having a projection, a pivoted cam arranged to permit the passage of said projection without actuating said ejector when the transferrer is swung in one direction and arranged to engage said projection to actuate said ejector when the transferrer is swung in the opposite direction.

42. A safety-pin machine having in combination guard-forming mechanism, guard-applying mechanism for applying the guard directly to the coil of a pin blank, and a transferrer for transferring the guard from the guard-forming mechanism to the guard-applying mechanism, said transferrer being provided with an ejector.

43. A safety-pin machine having in combination guard-forming mechanism, guard-applying mechanism, a swinging transferrer for transferring the guard from the guard-forming mechanism to the guard-applying mechanism, said transferrer being provided with an ejector adapted to be actuated by the swinging movement of said transferrer.

44. A safety-pin machine having in combination mechanism for coiling a wire, mechanism for forming a guard, mechanism for applying a guard, means for transferring the coiled wire from said coiling mechanism to said guard applying mechanism, a transferrer for transferring a guard from the guard-forming mechanism to the guard-applying mechanism, said transferrer being adapted to have both swinging and longitudinal movements imparted thereto, means for swinging said transferrer to transfer the guard from the guard-forming mechanism to the guard-applying mechanism, and means for moving said transferrer longitudinally to carry the guard on to the coiled end of the coiled wire.

GEORGE BODEN.

Witnesses:
J. H. REMSON,
CHARLES F. TOOHERTY.